(12) United States Patent
Leroux

(10) Patent No.: US 10,103,404 B2
(45) Date of Patent: Oct. 16, 2018

(54) MODULE HAVING A PLURALITY OF REMOVABLE CELLS, BATTERY COMPRISING SUCH A MODULE AND VEHICLE COMPRISING SUCH A BATTERY

(71) Applicant: RENAULT s.a.s., Boulogne-Billancourt (FR)

(72) Inventor: Thierry Leroux, Rouen (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 278 days.

(21) Appl. No.: 14/903,498

(22) PCT Filed: Jul. 4, 2014

(86) PCT No.: PCT/FR2014/051730
§ 371 (c)(1),
(2) Date: Feb. 2, 2016

(87) PCT Pub. No.: WO2015/004374
PCT Pub. Date: Jan. 15, 2015

(65) Prior Publication Data
US 2016/0149256 A1    May 26, 2016

(30) Foreign Application Priority Data

Jul. 11, 2013  (FR) ...................................... 13 56823

(51) Int. Cl.
*H01M 10/04* (2006.01)
*H01M 2/30* (2006.01)
(Continued)

(52) U.S. Cl.
CPC ......... *H01M 10/0468* (2013.01); *B60L 11/18* (2013.01); *H01M 2/206* (2013.01);
(Continued)

(58) Field of Classification Search
CPC .. H01M 10/0468; H01M 2/305; H01M 2/206; H01M 10/0413; H01M 2/26; H01M 10/0585; H01M 2220/20; B60L 11/18
See application file for complete search history.

(56) References Cited

U.S. PATENT DOCUMENTS 5,686,818 A * 11/1997 Scaduto .................. B60L 11/18
180/65.1
2005/0123828 A1   5/2005 Oogami et al.
(Continued)

FOREIGN PATENT DOCUMENTS

EP         1 530 247 A2   5/2005

OTHER PUBLICATIONS

International Search Report dated Nov. 13, 2014, in PCT/FR2014/051730 Filed Jul. 4, 2014.
(Continued)

*Primary Examiner* — Lisa S Park
(74) *Attorney, Agent, or Firm* — Oblon, McClelland, Maier & Neustadt, L.L.P.

(57) ABSTRACT

A module includes a plurality of flexible prismatic cells for storing electricity. Each cell includes, on at least one of the edges thereof, a flexible and flat electrical terminal. The cells are arranged against one another in order to form a stack and the electrical terminals of the cells are aligned in the stack. The flexible and flat terminals of a pair of two adjacent cells in the stack, one being a positive terminal and the other being a negative terminal, are folded between the two cells. Two spacers are inserted in the fold of each of the two flexible terminals, respectively. A compressive force is exerted on the stack of cells such that at least a portion of the two flexible terminals are compressed against one another between the two spacers.

14 Claims, 2 Drawing Sheets

(51) Int. Cl.
    *H01M 2/20*         (2006.01)
    *H01M 2/26*         (2006.01)
    *H01M 10/0585*    (2010.01)
    *B60L 11/18*        (2006.01)

(52) U.S. Cl.
    CPC ............ *H01M 2/26* (2013.01); *H01M 2/305* (2013.01); *H01M 10/0413* (2013.01); *H01M 10/0585* (2013.01); *H01M 2220/20* (2013.01)

(56) References Cited

U.S. PATENT DOCUMENTS

| | | |
|---|---|---|
| 2010/0216007 A1* | 8/2010 | Kane .................. H01M 2/0245 429/153 |
| 2011/0052951 A1 | 3/2011 | Yang et al. |
| 2011/0229754 A1 | 9/2011 | Zhao et al. |
| 2012/0107659 A1 | 5/2012 | Phlegm et al. |
| 2012/0156527 A1 | 6/2012 | Kataoka |
| 2012/0237808 A1 | 9/2012 | Yang et al. |
| 2013/0104390 A1 | 5/2013 | Zhao et al. |

OTHER PUBLICATIONS

French Preliminary Search Report dated Apr. 4, 2014, in FR 13 56823 Filed Jul. 11, 2013.

\* cited by examiner

MODULE HAVING A PLURALITY OF REMOVABLE CELLS, BATTERY COMPRISING SUCH A MODULE AND VEHICLE COMPRISING SUCH A BATTERY

The present invention relates to a module having a plurality of removable cells, a battery comprising such a module, and a vehicle comprising such a battery. The present invention applies in particular to electric or hybrid vehicles.

In the present context of consensus on global warming, the reduction of carbon dioxide ($CO_2$) emissions is a major challenge faced by car manufacturers, and the standards are becoming increasingly demanding in this area.

In addition to the constant improvement of efficiency of conventional heat engines, this being accompanied by a reduction in $CO_2$ emissions, electric vehicles ("EVs") and hybrid electric vehicles ("HEVs") are now considered to be the most promising solution in order to lower $CO_2$ emissions.

Different electrical energy storage technologies have been tested in recent years in order to maximize the autonomy of EVs, which must be regularly connected via a charger in order to recharge their traction battery. It would now appear that batteries having lithium-ion (Li-ion) cells make it possible to obtain the best compromise between power density, which promotes performance in terms of acceleration in particular, and energy density, which promotes autonomy. However, the use of this Li-ion technology to produce traction batteries for EVs is not without numerous difficulties, in particular under consideration of the voltage levels, which equate approximately to 400 volts (V), and the current levels required to drive an EV. In order to reach these levels of voltage and current, it is necessary to interconnect Li-ion cells in series and in parallel so as to form modules, then to interconnect modules to form a battery commonly exceeding 200 kilograms.

A conventional module is formed by stacking flexible prismatic cells of the "pouch" or "soft bag" type. These are cells provided in the form of a flexible casing made of plastic, which is substantially parallelepipedic or is in the form of a thick plate, containing a gel electrolyte. Each cell comprises, disposed on one or two of its edges, two connectors of the "tab" type, forming the positive and negative poles of the cell. Obtained by cutting strips measuring a few centimeters in width in metal sheets, these "tab" type connectors are flexible and flat and can be machined differently. For example, a known solution is to electrically connect the positive pole and the negative pole of two adjacent cells by means of a clinching method. Another known solution is to electrically connect them by means of a soldering method. A disadvantage of such methods is their cost and their lack of reliability, in particular in a vibrating environment such as a car. Another disadvantage is that the module thus obtained cannot be removed for recycling or repair without destroying the cells.

With the objective of overcoming these disadvantages, application FR2959609 discloses a module formed of flexible prismatic cells stacked one on top of the other and each comprising flexible and flat connectors. These flexible and flat connectors are pierced with holes and are interconnected by clamping between spacers, which are in turn pierced with holes. Tie rods pass through the holes in the connectors and in the spacers and apply the clamping force. The main disadvantage of this solution is the difficulty of assembly and disassembly of the module, which requires a number of tie rods to be screwed/unscrewed and also requires the manipulation of a multitude of elements, in particular screws, nuts, washers and spacers. In particular, a module of this type has proven to be completely unsuitable for assembly line production.

The object of the invention is in particular to overcome the aforementioned disadvantages, and in particular to provide a module that can be easily produced on an assembly line. The invention constitutes an excellent addition to the invention forming the basis of the French patent application having the application number FR1202026 filed in July 2012 by the applicant. To this end, the invention relates to a module comprising a plurality of flexible prismatic cells of the "pouch" or "soft bag" type for storing electricity. Each cell comprises, on at least one of the edges thereof, a flexible and flat electrical terminal of the "tab" type. The cells are arranged against one another in order to form a stack. The electrical terminals of the cells are aligned in the stack. The flexible and flat terminals of a pair of two adjacent cells in the stack, one being a positive terminal and the other being a negative terminal, are folded between said two cells. Two spacers are inserted in the fold of each of said two flexible terminals, respectively. The module comprises means for exerting a compressive force of the stack of cells disposed so as to compress at least a portion of said two terminals against one another between said two spacers. Herein the terms "terminal" and "connector" may be used interchangeably to refer to flexible and flat electrical terminals/connectors, for instance, of the "tab" type.

In a preferred embodiment each prismatic cell may comprise a positive terminal and a negative terminal disposed on opposite edges of said cell, which cells can be disposed in the stack such that each pair of adjacent cells has a positive terminal and a negative terminal compressed at least in part against one another between two spacers.

The negative terminal of a first cell of the stack may advantageously be connected to a negative terminal of said module, and the positive terminal of a last cell (16) of the stack may be connected to a positive terminal of said module.

For example, the means for exerting the compressive force may include at least one clamp, at least one spacer made of an electrically insulating material disposed between two cells in order to transmit the compressive force to the stack of cells as a whole.

For example, the clamp may be made at least in part of a deformable material, such that a restoring force, exerted by the material in order to return the clamp to a starting form, compresses the stack.

The spacers may advantageously be made at least in part of a material having an increased resistance to compression.

In one embodiment the compression means may include a receptacle containing the stack of cells, a cover of said receptacle being able to exert, in a closed configuration of said receptacle, a compressive force on the stack.

The invention also relates to a battery comprising at least one module as described above.

The invention yet further relates to an electric or hybrid vehicle comprising such a traction battery.

In addition, the main advantage of the present invention is that it allows the simple disassembly of the cells for recycling or repair.

Further features and advantages of the invention will become clear with the aid of the description which follows, provided with reference to the accompanying drawings, in which.

Figure 1:
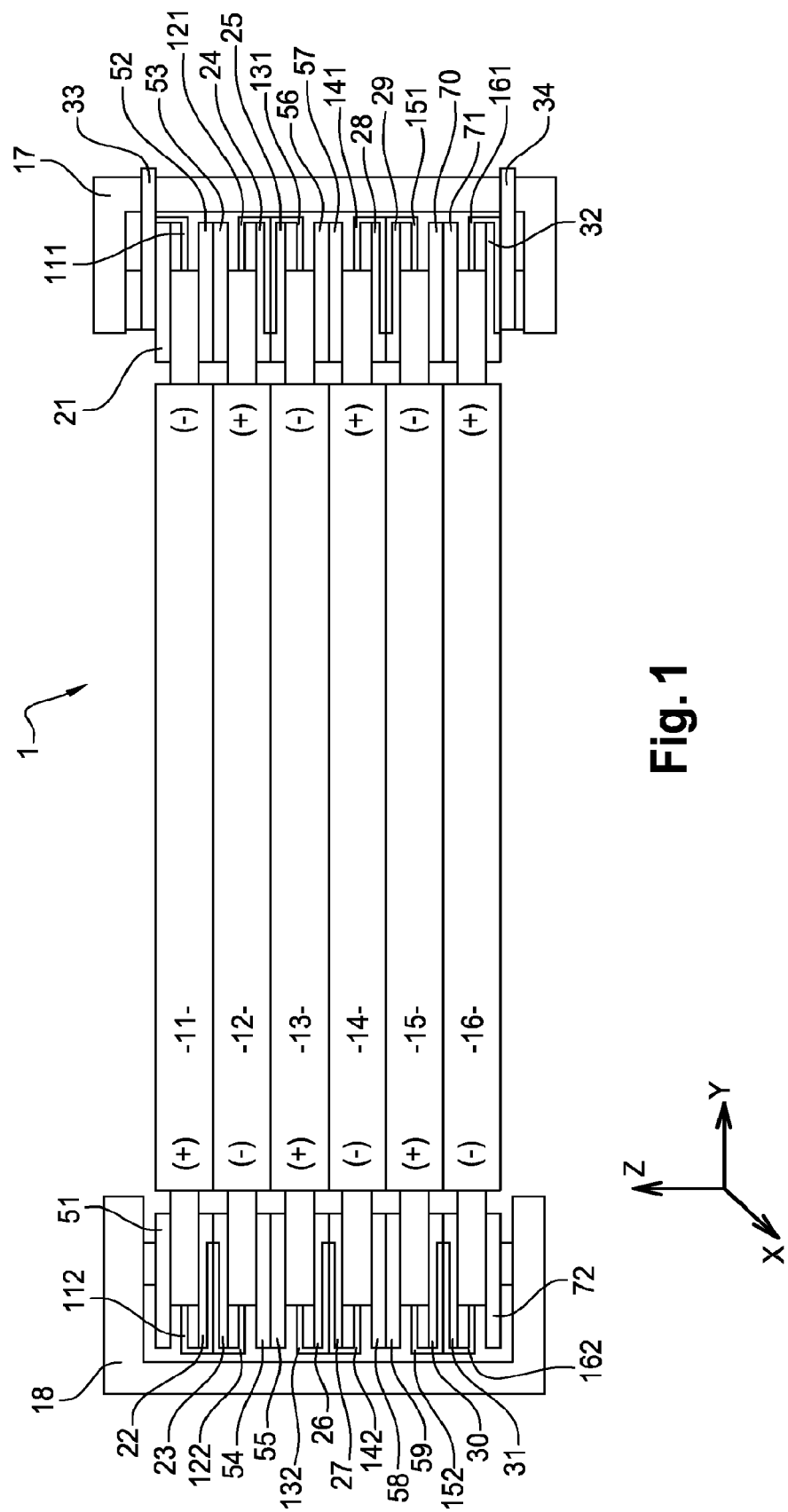
FIG. 1 shows a schematic view from above of an exemplary embodiment of a module according to the invention.
Figure 2:
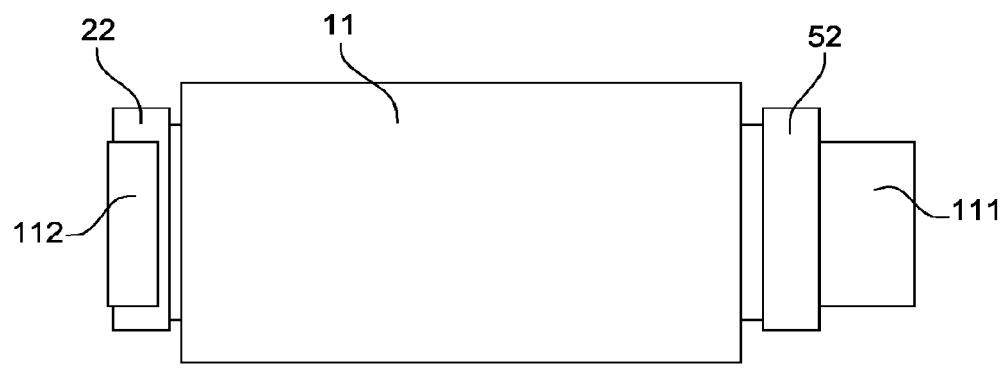
FIG. 2 shows a schematic view from below of a cell of a module according to the invention.

FIG. 1 illustrates, by means of a schematic view from above in a coordinate system (X, Y, Z), a module 1 representative of an exemplary embodiment of the invention. The module of this example comprises six flexible prismatic cells 11, 12, 13, 14, 15 and 16 of the "pouch" or "soft bag" type, stacked one on top of the other in the direction of the axis Z. It must be understood that, although relatively flexible when handled individually, the cells 11, 12, 13, 14, 15 and form a relatively rigid assembly once stacked. In addition, two elements 17 and 18 are disposed so as to clamp the stack of cells, exerting a compressive force on the stack in the direction of the axis Z, at four substantially rectilinear bearing surfaces in the direction of the axis X. In the following description of the present application, the elements 17 and 18 will therefore be designated more simply as "clamps". The clamps 17 and 18 advantageously may be made of a deformable material, for example a metal or plastic material, such that the compressive force is a simple restoring force exerted by the material in order to return the clamps 17 and 18 to their starting form. It must be understood that, in combination with the relative rigidity of the stack of cells, the clamps 17 and 18 thus assure at least in part the mechanical strength of the module 1. Each of the cells 11, 12, 13, 14, 15 and 16 comprises, on one of the edges thereof, a positive pole, as well as a negative pole on the opposite edge. The negative pole of the cell 11 is realized by a flexible and flat connector 111 of the "tab" type. The connector 111 is folded on the side opposite the adjacent cell 12, a spacer 21 being disposed in the fold of the connector 111. This spacer 21 was previously glued to the outer casing of the cell 11 in order to facilitate the assembly process, in the same way that all the spacers described hereinafter have been pre-glued to their adjacent cell. The spacer may be made equally of an electrically conductive material, such as a metal, or of an electrically insulating material, such as plastic, provided that the material used provides the spacer 21 with an increased resistance to compression. Between the folded end of the connector 111 and the clamp 17, there is inserted a terminal 33 forming the negative pole of the module 1. The cells are arranged such that two successive cells in the stack have their poles of opposed polarity arranged opposite one another. The positive pole of the cell 11, realized by the flexible and flat connector 112, is thus disposed opposite the negative pole of the cell 12, realized by the flexible and flat connector 122. The connectors 112 and 122 are both folded between the cells 11 and 12. A spacer 22 is disposed in the fold of the connector 112, said spacer being pre-glued to the outer casing of the cell 11, whereas a spacer 23 is disposed in the fold of the connector 122, said spacer being pre-glued to the outer casing of the cell 12, such that the folded ends of the connectors 112 and 122 are held firmly in electrical contact between the spacers 22 and 23, under the pressure exerted by the clamp 18. To this end, a spacer 51 made of an electrically insulating material is inserted between the cell 11 and the clamp 18 so as to transmit the compressive force exerted by the clamp 18 to the rest of the stack. The spacers 22 and 23 for their part may be made equally of an electrically conductive material, such as a metal, or of an electrically insulating material, such as plastic, provided that the used material provides the spacers 22 and 23 with an increased resistance to compression. The positive pole of the cell 12, realized by the flexible and flat connector 121, is disposed opposite the negative pole of the cell 13, realized by the flexible and flat connector 131. The connectors 121 and 131 are both folded between the cells 12 and 13. A spacer 24 is disposed in the fold of the connector 121, said spacer being pre-glued to the outer casing of the cell 12, whereas a spacer 25 is disposed in the fold of the connector 131, said spacer being pre-glued to the outer casing of the cell 13, such that the folded ends of the connectors 121 and 131 are held firmly in electrical contact between the spacers 24 and 25, under the pressure exerted by the clamp 17. To this end, spacers 52 and 53 made of an electrically insulating material are inserted between the cells 11 and 12 to which said spacers were pre-glued respectively, so as to transmit the compressive force exerted by the clamp 17 to the rest of the stack. The spacers 24 and 25 for their part may be made equally of an electrically conductive material, such as a metal, or of an electrically insulating material, such as plastic, provided that the used material provides the spacers 24 and 25 with an increased resistance to compression. FIG. 2 illustrates, by means of a view from below, the cell 11 before the connector 111 is folded around the spacer 21, which is in turn covered by the spacer 52 in FIG. 2. The positive pole of the cell 13, realized by the flexible and flat connector 132, is disposed opposite the negative pole of the cell 14, realized by the flexible and flat connector 142. The connectors 132 and 142 are both folded between the cells 13 and 14. A spacer 26 is disposed in the fold of the connector 132, said spacer being pre-glued to the outer casing of the cell 13, whereas a spacer 27 is disposed in the fold of the connector 142, said spacer being pre-glued to the outer casing of the cell 14, such that the folded ends of the connectors 132 and 142 are held firmly in electrical contact between the spacers 26 and 27, under the pressure exerted by the clamp 18. To this end, spacers 54 and 55 made of an electrically insulating material are inserted between the cells 12 and 13 to which said spacers were pre-glued respectively, so as to transmit the compressive force exerted by the clamp 18 to the rest of the stack. The spacers 26 and 27 for their part may be made equally of an electrically conductive material, such as a metal, or of an electrically insulating material, such as plastic, provided that the used material provides the spacers 26 and 27 with an increased resistance to compression. The positive pole of the cell 14, realized by the flexible and flat connector 141, is disposed opposite the negative pole of the cell 15, realized by the flexible and flat connector 151. The connectors 141 and 151 are both folded between the cells 14 and 15. A spacer 28 is disposed in the fold of the connector 141, said spacer being pre-glued to the outer casing of the cell 14, whereas a spacer 29 is disposed in the fold of the connector 151, said spacer being pre-glued to the outer casing of the cell 15, such that the folded ends of the connectors 141 and 151 are held firmly in electrical contact between the spacers 28 and 29, under the pressure exerted by the clamp 17. To this end, spacers 56 and 57 made of an electrically insulating material are inserted between the cells 13 and 14 to which said spacers were pre-glued respectively, so as to transmit the compressive force exerted by the clamp 17 to the rest of the stack. The spacers 28 and 29 for their part may be made equally of an electrically conductive material, such as a metal, or of an electrically insulating material, such as plastic, provided that the used material provides the spacers 28 and 29 with an increased resistance to compression. The positive pole of the cell 15, realized by the flexible and flat connector 152, is disposed opposite the negative pole of the cell 16, realized by the flexible and flat connector 162. The connectors 152 and 162 are both folded between the cells 15 and 16. A spacer 30 is disposed in the fold of the connector 152, said spacer being pre-glued to the outer casing of the cell 15, whereas a spacer 31 is disposed in the fold of the connector 162, said spacer being pre-glued to the outer casing of the cell 16, such that the folded ends of the connectors 152 and 162 are held firmly in electrical contact between the spacers 30 and 31, under the pressure exerted by the clamp 18. To this end, spacers 58 and 59 made of an electrically insulating material are inserted between the cells 14 and 15 to which said spacers were pre-glued respectively. Likewise, a spacer made of an electrically insulating material is inserted between the cell 16, to which said spacer was pre-glued, and the clamp 18, so as to transmit the compressive force exerted by the clamp 18 to the rest of the stack. The spacers 30 and 31 for their part may be made equally of an electrically conductive material, such as a metal, or of an electrically insulating material, such as plastic, provided that the used material provides the spacers 30 and 31 with an increased resistance to compression. The positive pole of the cell 16 is realized by the flexible and flat connector 161. The connector 161 is folded on the side opposite the adjacent cell 15, a spacer 32 being disposed in the fold of the connector 161 and being pre-glued to the outer casing of the cell 16. Between the folded end of the connector 161 and the clamp 17, there is inserted a terminal 34 forming the negative pole of the module 1. The folded end of the connector 161 and the terminal 34 are held firmly in electrical contact between the spacer 32 and the clamp 17, under the pressure exerted by said clamp 17. To this end, spacers 70 and 71 made of an electrically insulating material are inserted between the cells 15 and 16 to which they were pre-glued respectively, so as to transmit the compressive force exerted by the clamp 17 to the rest of the stack.

Figure 3:
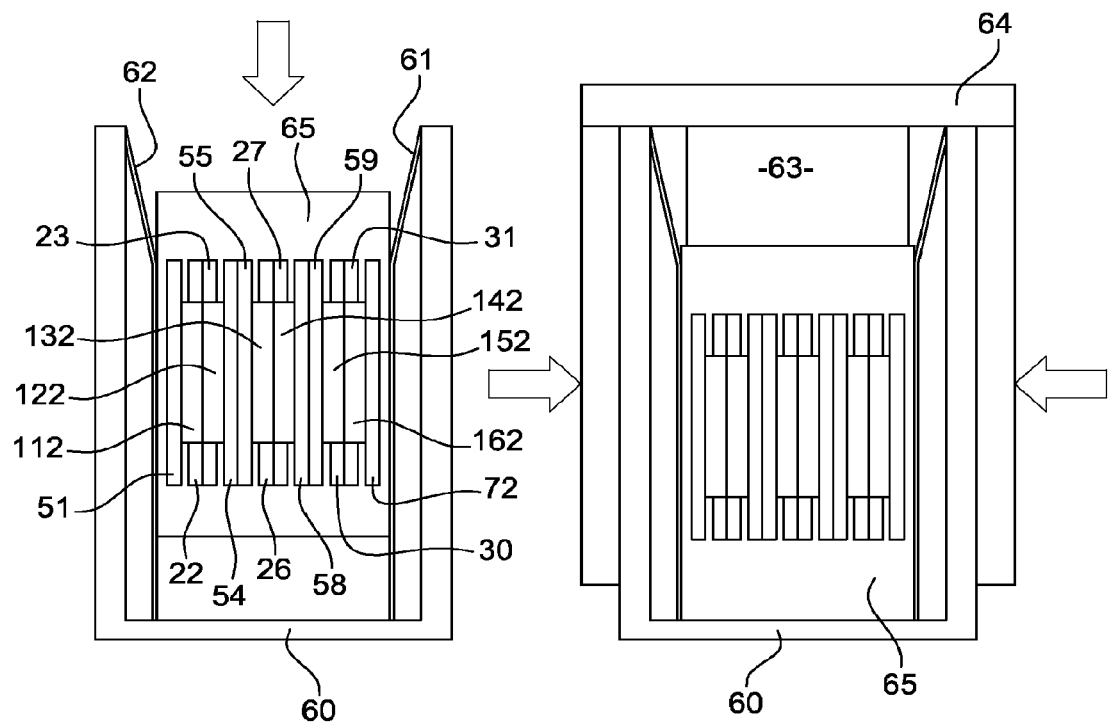
FIG. 3 shows a schematic sectional view from the front of a receiving housing for a module according to the invention.

FIG. 3 schematically illustrates another embodiment, in which the clamps 17 and 18, which had the primary function of exerting a compressive force on the stack of cells 11 to 16, have been replaced by a housing. In FIG. 3, for reasons of clarity, the cells 11 to 16 have not been shown individually, and only the stack thereof is illustrated, referenced 65. The cells are disposed vertically, as indicated by the vertical arrangement of the spacers 51, 22, 23, 54, 55, 26, 27, 58, 59, 30, 31 and 72, as well as the vertical arrangement of the connectors 112, 122, 132, 142, 152 and 162. This housing is formed by a receptacle 60, in which the stack 65 can be inserted. Ribs 61 and 62 are disposed in the receptacle 60 so as to first position the stack 65 and then apply a first compressive force thereto. The receptacle 60 can be closed by a cover 64, of which the edges exert a second compressive force on the stack 65 by means of the edges of the receptacle 60. A cushioning element 63, for example made of foam, disposed between the cover 64 and the stack 65 makes it possible to keep said stack at the bottom of the receptacle 61.

In another embodiment the stack of cells may be enclosed advantageously in a housing such that the stack is compressed between the receptacle of the housing and the cover thereof. For example, the housing may be a housing corresponding to the battery module housing described by the applicant in the French patent application of which the application number is FR1202026.

The invention described above also has the main advantage that it proposes a compact module allowing a maximum number of cells in a limited available volume, thus increasing autonomy. Yet a further advantage of the invention is its cost of implementation, which is considerably lower than the cost of an assembly by soldering or by clinching.

The invention claimed is:
1. A module, comprising:
a plurality of flexible prismatic cells configured to store electricity, each said flexible prismatic cell comprising, on at least one of the edges thereof, a flexible and flat electrical terminal, the flexible prismatic cells being arranged against one another in order to form a stack, the flexible and flat electrical terminals of the flexible prismatic cells being aligned in the stack, wherein
the flexible and flat electrical terminals of a pair of two adjacent flexible prismatic cells in the stack, where a first flexible and flat electrical terminal associated with the pair is a positive terminal and a second flexible and flat electrical terminal associated with the pair is a negative terminal, are folded between said two adjacent flexible prismatic cells,
two spacers are inserted in respective folds of the first and second flexible and flat electrical terminals, between said first and second flexible and flat electrical terminals and respective ones of the pair of two adjacent flexible prismatic cells,
means for exerting a compressive force to the stack of flexible prismatic cells disposed so as to compress at least a portion of said first and second flexible and flat electrical terminals against one another between said two spacers, and
the first and second flexible and flat electrical terminals are in direct contact with each other.
2. The module as claimed in claim 1, wherein each said flexible prismatic cell comprises a positive terminal and a negative terminal disposed on opposite edges of said flexible prismatic cell, the flexible prismatic cells being disposed in the stack such that each pair of adjacent flexible prismatic cells has a positive terminal and a negative terminal compressed at least in part against one another between two spacers.
3. The module as claimed in claim 1, wherein the negative terminal of a first flexible prismatic cell of the stack is connected to a negative terminal of said module, and the positive terminal of a last flexible prismatic cell of the stack is connected to a positive terminal of said module.
4. The module as claimed in claim 2, wherein the means for exerting the compressive force include:
at least one clamp, and
at least one spacer made of an electrically insulating material disposed between two of the flexible prismatic cells in order to transmit the compressive force to the stack of cells as a whole.
5. The module as claimed in claim 4, wherein the at least one clamp is made at least in part of a deformable material, such that a restoring force, exerted by the deformable material in order to return the at least one clamp to a starting form, compresses the stack.
6. The module as claimed in claim 1, wherein the spacers are made at least in part of a material that resists compression.
7. The module as claimed in claim 1, wherein the means for exerting the compressive force include a receptacle containing the stack of flexible prismatic cells, a cover of said receptacle exerting, in a closed configuration of said receptacle, a compressive force on the stack.
8. A battery, comprising:
at least one module as claimed in claim 1.
9. An electric or hybrid vehicle, comprising:
a battery as claimed in claim 8.
10. A battery module, comprising:
a plurality of flexible prismatic cells configured to store electricity, each said flexible prismatic cell comprising, on at least one of the edges thereof, a flexible and flat electrical connector, the flexible prismatic cells being arranged against one another in order to form a stack, the flexible and flat electrical connector of the flexible prismatic cells being aligned in the stack, wherein the flexible and flat electrical connectors of a pair of two adjacent flexible prismatic cells in the stack, a first flexible and flat electrical connector associated with the pair being a positive connector and a second flexible and flat electrical connector associated with the pair being a negative connector, are folded toward each other so as to be in direct contact with each other, a first spacer in a first fold of the first flexible and flat electrical connector, at least a portion of the first spacer being between the first flexible and flat electrical connector and a first flexible prismatic cell of the pair of adjacent flexible prismatic cells, and a second spacer in a second fold of the second flexible and flat electrical connector, at least a portion of the second spacer being between the second flexible and flat electrical connector and a second flexible prismatic cell of the pair of adjacent flexible prismatic cells.

11. The battery module as claimed in claim 10, further comprising a clamp configured to provide a compressive force to the stack of flexible prismatic cells.

12. The battery module as claimed in claim 10, wherein a portion of the first flexible and flat electrical connector and a portion of the second flat electrical connector are between said two adjacent flexible prismatic cells.

13. The battery module as claimed in claim 10, wherein the first spacer directly contacts the second spacer.

14. The battery module as claimed in claim 13, wherein the first spacer directly contacts the second spacer at a position between the first and second flexible prismatic cells of the pair of adjacent flexible prismatic cells.

* * * * *